(12) United States Patent
Kim et al.

(10) Patent No.: US 6,456,343 B2
(45) Date of Patent: Sep. 24, 2002

(54) LIQUID CRYSTAL DISPLAY

(75) Inventors: Young-Su Kim; Joung-Jae Lee, both of Kumi-shi (KR)

(73) Assignee: L.G. Philips LCD Co., Ltd., Seoul (KR)

(*) Notice: Subject to any disclaimer, the term of this patent is extended or adjusted under 35 U.S.C. 154(b) by 0 days.

(21) Appl. No.: 09/826,101

(22) Filed: Apr. 5, 2001

(30) Foreign Application Priority Data

Jul. 20, 2000 (FR) ........................................ 2000-41531

(51) Int. Cl.[7] ............................................. G02F 1/1333
(52) U.S. Cl. ........................ 349/58; 361/368; 345/905
(58) Field of Search ............................ 349/58; 361/368; 345/905

(56) References Cited

U.S. PATENT DOCUMENTS 5,673,982 A  * 10/1997  Chase et al. ................. 361/681
5,872,606 A  *  2/1999  Kim ............................. 349/58
6,064,565 A  *  5/2000  Ishihara et al. ............. 361/681
6,128,183 A  * 10/2000  Ichiyama et al. ........... 361/681
6,144,423 A  * 11/2000  Kim ............................. 349/58
6,292,239 B1 *  9/2001  Nagamura et al. .......... 349/58

* cited by examiner

Primary Examiner—Kenneth Parker
Assistant Examiner—V. Litovchenko
(74) Attorney, Agent, or Firm—McKenna Long & Aldridge

(57) ABSTRACT

A liquid crystal display that resists idling of a nut used for fixing a liquid crystal module in a main supporter. In the liquid crystal display a main supporter holds a backlight unit and a liquid crystal display panel. A top case encloses edges of the liquid crystal display panel and the main supporter. An inserting nut is pressed into a cross-shaped hole in the top case. A screw threads into the inserting nut and into a recess in the main supporter to fix the top case to the main supporter.

17 Claims, 7 Drawing Sheets

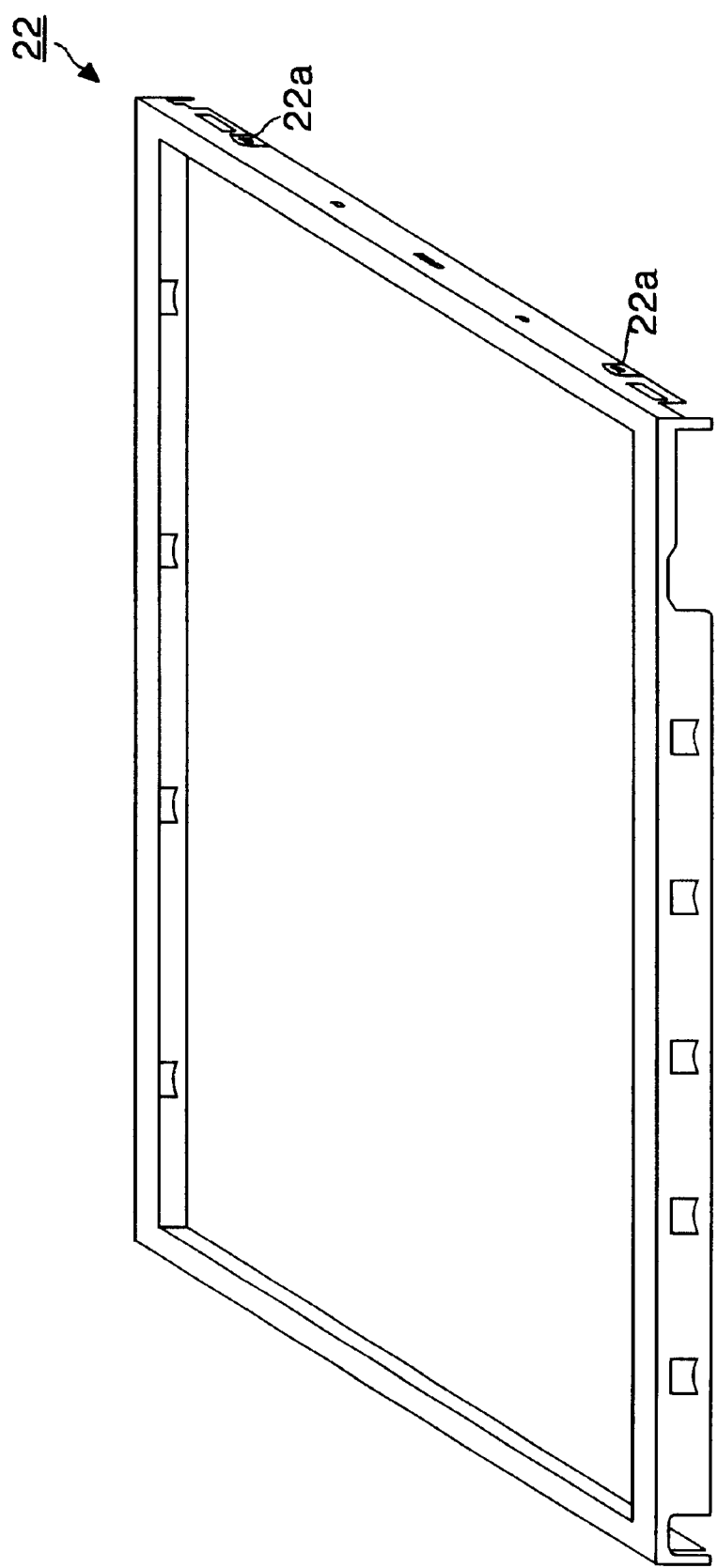

LIQUID CRYSTAL DISPLAY

This application claims the benefit of Korean Patent Application No. 2000-41531, filed on Jul. 20, 2000, which is hereby incorporated by reference for all purposes as if fully set forth herein.

BACKGROUND OF THE INVENTION

1. Field of the Invention

The present invention relates to a liquid crystal display, and more particularly to a liquid crystal display that prevents idling of a nut that is used for fixing the liquid crystal display to a supporter.

2. Discussion of the Related Art

FIG. 1 shows a plan view of a conventional liquid crystal display of a notebook personal computer, while FIG. 2 is a section view of the liquid crystal display of FIG. 1 taken along line A–A'. Generally, as shown in FIG. 1 and FIG. 2, a liquid crystal display in a notebook personal computer includes a main supporter 58 into which inserting nuts 54 are pressed. A backlight unit and a liquid crystal display panel are located inside the main supporter 58. Additionally, a bottom cover 62 surrounds the bottom surface and the side surface of one side of the main supporter 58. A top case 52 fixes the main supporter 58 and the liquid crystal display panel.

The main supporter 58 is a molded product formed with an internal stepped face. The backlight unit is on an internal bottom surface of the main supporter 58. The backlight unit includes a light guide 10, a reflective mirror 12, upper and lower diffusion sheets 14 and 20, upper and lower prism sheets 16 and 18, and a lamp housing (not shown). A liquid crystal panel is disposed on the wall of the stepped face of the main supporter 58. The liquid crystal panel is comprised of a liquid crystal that is injected between upper and lower substrates 2 and 4, and attached polarizers 6 and 8.

A lamp is in the lamp housing (not shown). That lamp housing is retained to the main supporter 58 by a screw. The lamp housing is electrically connected via a plug 60 to an inverter. The bottom cover 62 has a plane part and a side part that are bent perpendicularly to each other so as to enclose the bottom surface and a side surface of the main supporter 58. A screw hole 62a through which a screw 56 passes is defined in the side of the bottom cover 62. An inserting nut 54 is pressed into the side surface of the main supporter 58. The top case 52 has a square-band shape with a plane part and a side part that are bent perpendicularly to each other. A screw hole 52a, through which the screw 56 passes, is defined in the side part of the top case 52.

The liquid crystal module is fixed by means of screws 56 threaded into inserting nuts 54. The left side (with reference to FIG. 2) of the liquid crystal module is fixed by a screw 56 that passes through a screw hole 52a of the top case 52 and that threads into an inserting nut 54 pressed into the main supporter 58. The right side of the liquid crystal module is fixed by a screw 56 that passes through screw holes 52a and 62a and that threads into an inserting nut 54 that is pressed into the main supporter 58.

In the conventional liquid crystal module, the inserting nut 54 is ideally vertically pressed into the side surface of the main supporter 58. However, it often happens that the inserting nut 54 is obliquely pressed into the main supporter 58. In that case, the inserting nut 54 and the screw 56 do not engage properly due to the inclination angle of the inserting nut 54. If the inclination angle is severe enough the screw 56 and the inserting nut 54 are abraded when the screw 56 is tightened into the inserting nut 54. If a conductive particle produced by this abrasion adheres to a bonded portion of a tape carrier package (TCP) of the liquid crystal display panel, an electrical short between electrodes can result. Furthermore, if the inclination angle prevents adequate tightening of the assembly, the screw 56 and the inserting nut 54 can idle at the main supporter 58.

SUMMARY OF THE INVENTION

Accordingly, the present invention is directed to a liquid crystal display that substantially obviates one or more of the problems due to limitations and disadvantages of the related art.

An object of the present invention is to provide a liquid crystal display that prevents idling of a nut used for fixing a liquid crystal module.

Additional features and advantages of the invention will be set forth in the description that follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a liquid crystal display device according to the present invention includes a main supporter holding a backlight unit and a liquid crystal display panel; a top case for enclosing the edges of the liquid crystal display panel and the main supporter; and an inserting nut that is pressed into the top case and is used for fixing the top case and the main supporter by way of a screw.

It is to be understood that both the foregoing general description and the following detailed description are exemplary and explanatory and are intended to provide further explanation of the invention as claimed.

BRIEF DESCRIPTION OF THE DRAWING

The accompanying drawings, which are included to provide a further understanding of the invention and are incorporated in and constitute a part of this specification, illustrate embodiments of the invention and together with the description serve to explain the principles of the invention.

In the drawings:

FIG. 4 is a perspective view of a top case used in the liquid crystal display shown in FIG. 3;

DETAILED DESCRIPTION OF THE ILLUSTRATED EMBODIMENT

Reference will now be made in detail to the illustrated embodiment of the present invention, an example of which is shown in the accompanying drawings.

Figure 1:
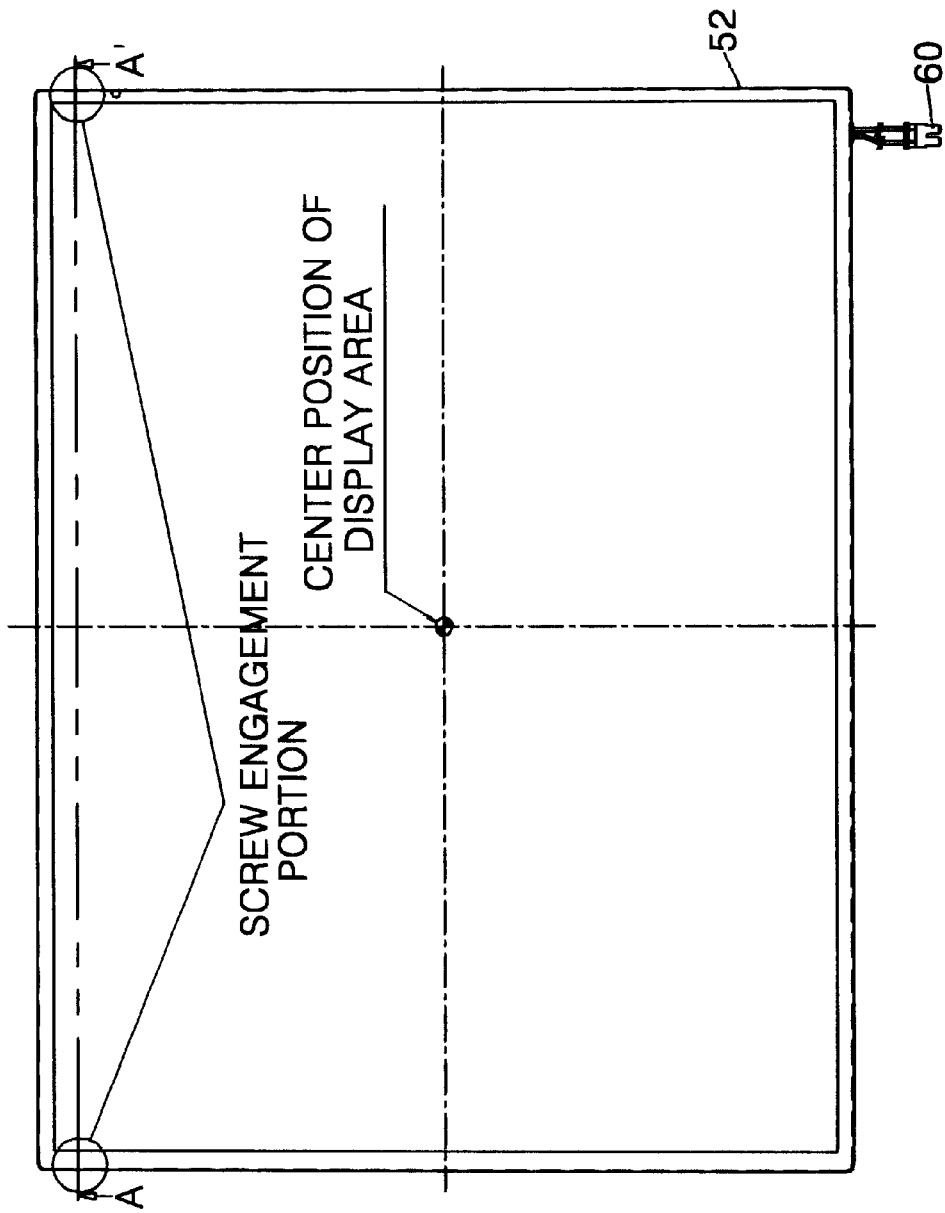
FIG. 1 is a plan view showing a structure of a conventional liquid crystal display of a notebook personal computer.
Figure 2:
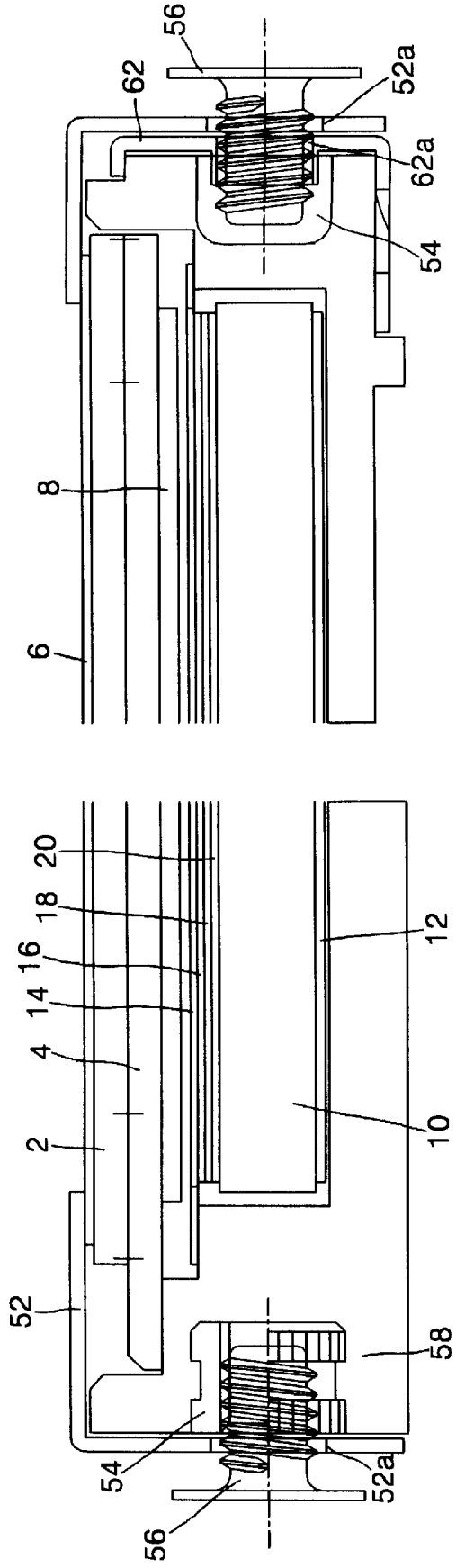
FIG. 2 is a section view of the liquid crystal display of FIG. 1 taken along line A–A'.
Figure 3:
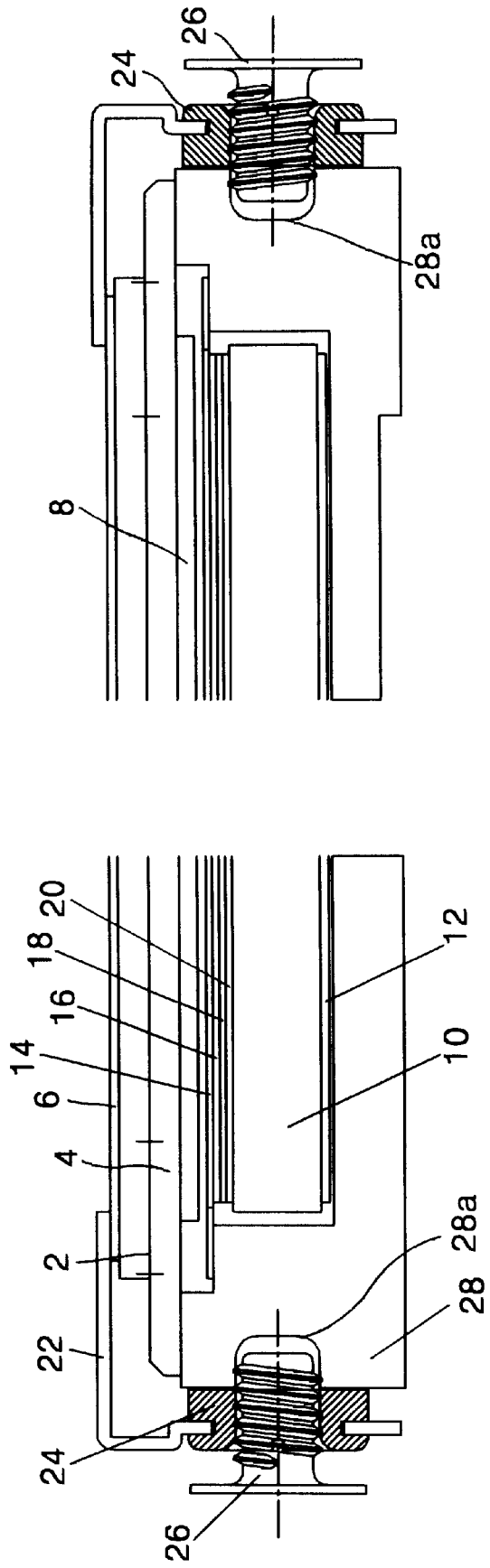
FIG. 3 is a section view showing a structure of a liquid crystal display according to an embodiment of the present invention.

Referring to FIG. 3, there is shown a liquid crystal display (LCD) according to an embodiment of the present invention. The LCD includes a main supporter 28, which holds a backlight unit and a liquid crystal display panel, and a top case 22. The top case includes openings into which inserting nuts 24 are press formed. The inserting nuts are used to fix the main supporter 28 to the liquid crystal display panel. The main supporter 28 is a molded product having an internal surface with a stepped face. Inside the main supporter 28 are a backlight unit and the liquid crystal display. The main supporter 28 is provided with molded screw recesses 28a for receiving screws 26.

Figure 5A:
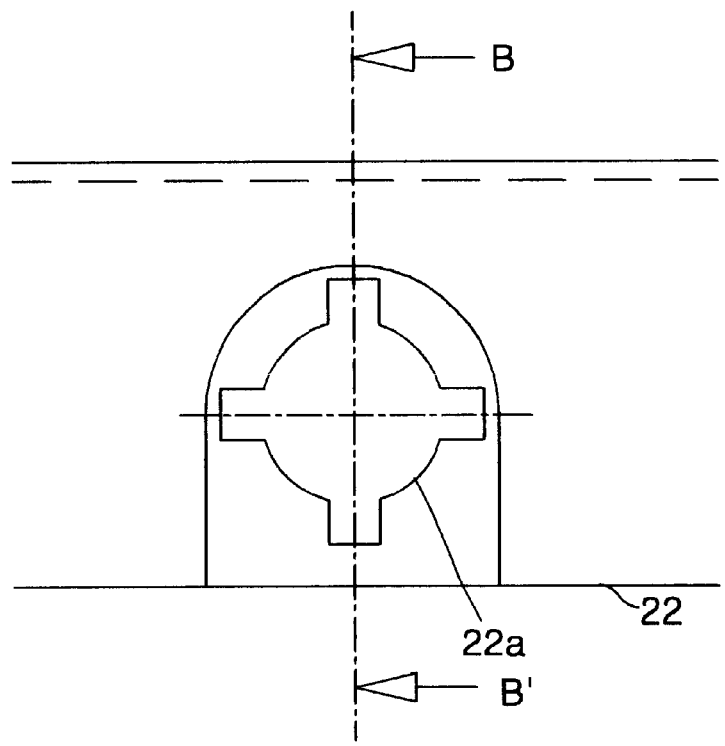
FIG. 5A is an enlarged plan view of a circular cross-shaped hole defined in the top case shown in FIG. 4.
Figure 5B:
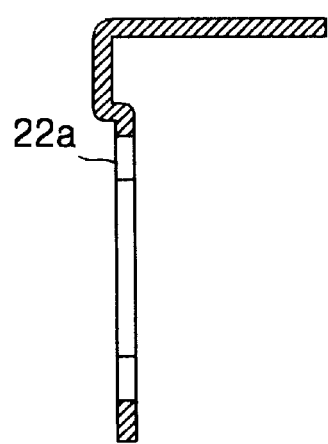
FIG. 5B is a section view of the circular cross-shaped hole taken along line BB' of FIG. 5A.

The top case 22 is beneficially formed from stainless steel. The top case has a square band shape with a plane part and a side part that are bent perpendicularly to each other, reference FIG. 4. As shown in FIG. 5A and FIG. 5B, circular cross-shaped holes 22a are defined through the side part of the top case 22. Inserting nuts 24 (see below) are press formed in the circular cross-shaped holes 22A.

Figure 6A:
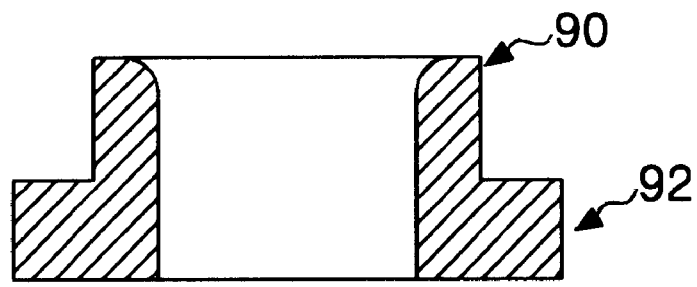
FIG. 6A is a section view of an inserting nut prior to being press formed in the top case shown in FIG. 4.

Referring now to FIG. 6A, the inserting nut 24 is comprised of a relatively malleable metal, for example brass, so that a shape variation can be generated by pressing. The outer diameter of the upper part 90 of the inserting nut 24a prior to assembly into the circular cross-shape hole 22a is smaller than the diameter of the circular cross-shaped hole 22a, whereas the outer diameter of the lower part lower 92 is larger than the diameter of the circular cross-shaped hole 22a. The diameter of the screw recess 28a defined in the main supporter 28 is beneficially equal to that of the thread surfaces of the inserting nut 24a.

Figure 6B:
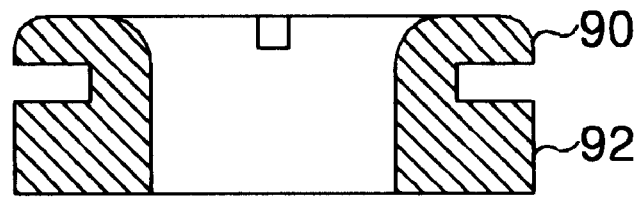
FIG. 6B is a section view of an inserting nut after being press formed in the top case shown in FIG. 4.

Assembly of the inserting nut 24 into the circular cross-shaped hole 22a begins with inserting the upper part 90 into the circular cross-shaped hole 22a from the inside of the top case 22. After being thus inserted, the upper part 90 is compressed using a press. Then, as shown in FIG. 6B, the upper part 90 is widened to press against the circular cross-shaped hole 22a. The press forming of the inserting nut causes the inserting nut to flow into contact with the cross-shaped notch.

Figure 7:
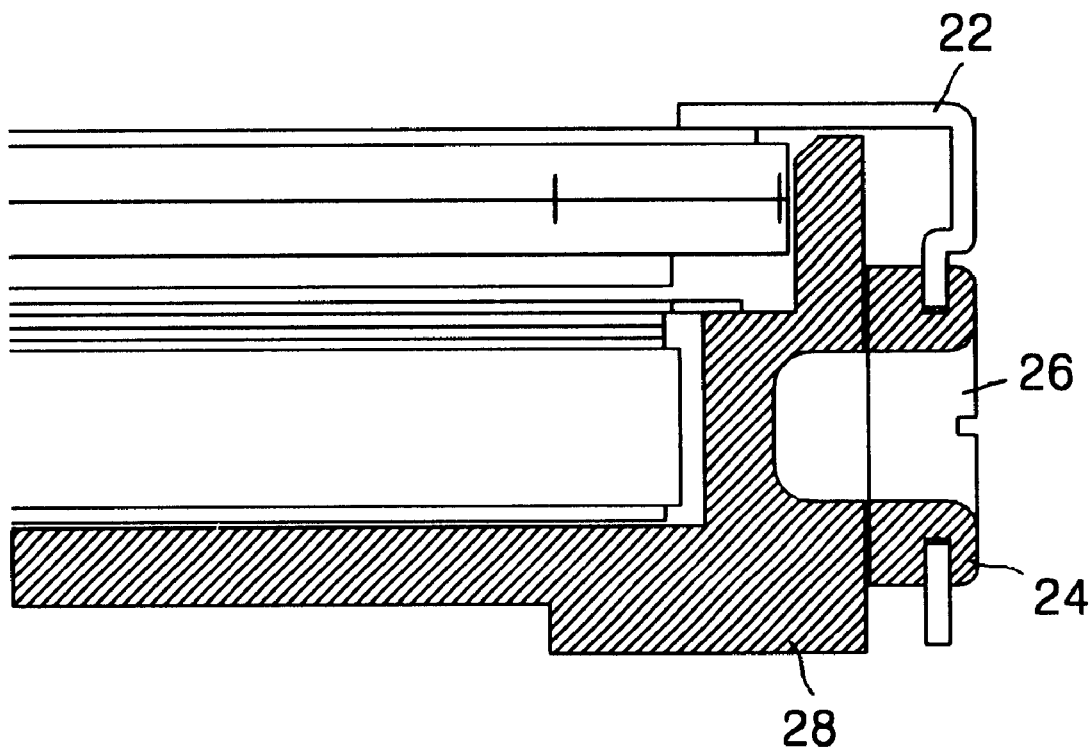
FIG. 7 is a section view showing a completely engaged screw in the liquid crystal display of FIG. 3.

After the inserting nut 24 is press formed in the top case 22, the top case 22 is fitted to the main supporter 28 in such a manner that the inserting nut 24 is aligned with the screw recess 28a. At this time, the plane part of the top case 22 encloses edges of the liquid crystal display panel. Then, a screw 26 is threaded into the inserting nut 24. As the screw 26 advances through the inserting nut 24, the screw 26 engages the screw recess 28a of the main supporter 28. Thus, as the screw 26 is tightened, the top case 22 is not widened toward the outside thereof. When fastening is complete, as shown in FIG. 7, the liquid crystal display panel and the backlight unit are retained within the main supporter 28, and the main supporter 28 and the top case 22 are secured to each other by the inserting nut 24 and the screw 26 that passes through the screw hole 28a.

As described above, according to the present invention, the inserting nut 24 pressed into the circular cross-shaped hole 22a can better withstand screw torque than an inserting nut pressed into a circle hole. Thus, the inserting nut and screw do idle during screw engagement. Also, when the end of the screw 26 contacts the inserting nut 24 all engaged components are outside of the liquid crystal module. Thus, even if conductive particles are created by abrasion between the screw 26 with the inserting nut 24, the conductive particles can not get inside the liquid crystal display panel.

It will be apparent to those skilled in the art that various modifications and variation can be made to the present invention without departing from the spirit or scope of the invention. Thus, it is intended that the present invention covers the modifications and variations of this invention provided they come within the scope of the appended claims and their equivalents.

What is claimed is:

1. A liquid crystal display device, comprising:
   a main supporter holding a backlight unit and a liquid crystal display panel;
   a top case enclosing a top edge and a side edge of the liquid crystal display panel, and a side edge of the main supporter, wherein said top case includes a hole;
   an inserting nut press formed in said hole; and
   a screw threaded into said inserting nut, wherein said screw fixes said top case to said main supporter such that said liquid crystal display panel is retained in said main supporter.

2. A liquid crystal display device according to claim 1, wherein hole includes a notch.

3. A liquid crystal display device according to claim 2, wherein notch is cross-shaped.

4. A liquid crystal display device according to claim 1, wherein said main supporter includes a receiving recess that receives said screw.

5. A liquid crystal display device according to claim 4, wherein said receiving recess is dimensioned such that said screw threads into said receiving recess.

6. A liquid crystal display device according to claim 5, wherein said receiving recess has a radius substantially equal to a tread radius of said inserting nut.

7. A liquid crystal display device according to claim 2, wherein said inserting nut is comprised of a malleable material.

8. A liquid crystal display device according to claim 7, wherein said malleable material is brass.

9. A liquid crystal display device according to claim 1, wherein said main supporter includes a step-faced interior surface having a wall in contact with said liquid crystal display panel.

10. A liquid crystal display device according to claim 1, wherein backlight units rests on an inner surface of said main supporter.

11. A liquid crystal display device according to claim 1, wherein said top case has a planer top wall and a side wall that are substantially perpendicular, wherein said hole is in said side wall.

12. A method of assembling a liquid crystal display device, comprising:
   installing a backlight unit and a liquid crystal display panel in an interior chamber of a main supporter;
   inserting an inserting nut in a predefined hole in a side edge of a top case;
   press forming said inserting nut such that the inserting nut is retained in the predefined hole;
   locating the top case on the main supporter such that the liquid crystal display panel has a top edge and a side edge protected by the top case and such that the inserting nut is aligned with a recess in the main supporter; and
   fixing the top case and the main supporter together by threading a screw into the inserting nut, wherein the liquid crystal display panel is retained in the main supporter.

13. A method of assembling a liquid crystal display device according to claim 12, wherein press forming the inserting nut engages the inserting nut the a notch in the hole such that the inserting nut resists idling.

14. A method of assembling a liquid crystal display device according to claim 12, wherein threading the screw into the inserting nut causes the screw to enter the recess.

15. A method of assembling a liquid crystal display device according to claim 14, wherein threading the screw into the inserting nut causes the screw to thread into the recess.

16. A method of assembling a liquid crystal display device according to claim 12, wherein installing the backlight unit in the main supporter causes the backlight unit to rest on an inner surface of the main supporter.

17. A method of assembling a liquid crystal display device according to claim 12, wherein installing the liquid crystal display panel in the main supporter causes the liquid crystal display panel to rest on an inner surface of the main supporter.

* * * * *